(12) United States Patent
Hsu

(10) Patent No.: US 7,362,658 B2
(45) Date of Patent: Apr. 22, 2008

(54) INSECT REPELLING SYSTEM USING FEEDBACK

(76) Inventor: John M. Hsu, 13603 Marina Pointe Dr., D524, Marina Del Rey, CA (US) 90292

( * ) Notice: Subject to any disclaimer, the term of this patent is extended or adjusted under 35 U.S.C. 154(b) by 0 days.

(21) Appl. No.: 11/403,661

(22) Filed: Apr. 12, 2006

(65) Prior Publication Data
US 2007/0242566 A1    Oct. 18, 2007

(51) Int. Cl.
*H04B 1/02* (2006.01)
(52) U.S. Cl. .................................. 367/139
(58) Field of Classification Search ............. 367/139, 367/901; 340/384.2; 43/132.1; 116/22 A
See application file for complete search history.

(56) References Cited
U.S. PATENT DOCUMENTS

| | | | | |
|---|---|---|---|---|
| 2,861,132 A * | 11/1958 | Kahn et al. | ............ | 43/132.1 |
| 3,673,567 A * | 6/1972 | McClellan, Sr. | ............ | 367/139 |
| 3,823,691 A * | 7/1974 | Morgan | .................. | 367/139 |
| 4,896,305 A * | 1/1990 | Gimbal | .................. | 367/139 |
| 5,034,808 A * | 7/1991 | Murray | .................... | 381/85 |
| 6,882,594 B1 | 4/2005 | Pujolas | | |
| 6,990,207 B2 * | 1/2006 | Nakamura et al. | ....... | 381/71.13 |
| 2005/0238179 A1* | 10/2005 | Erdmann | ................ | 381/71.4 |
| 2007/0242566 A1* | 10/2007 | Hsu | ....................... | 367/139 |

* cited by examiner

*Primary Examiner*—Dan Pihulic
(74) *Attorney, Agent, or Firm*—Patent Law Group LLP; David C. Hsia

(57) ABSTRACT

An insect repelling system includes (1) a microphone for converting pressure waves generated by a flying insect flapping its wings into electrical signals, and (2) a speaker for generating pressure waves toward the flying insect based on the electrical signals.

23 Claims, 3 Drawing Sheets

INSECT REPELLING SYSTEM USING FEEDBACK

DESCRIPTION OF RELATED ART

U.S. Pat. No. 6,882,594 discloses a system for repelling flying insects from an area by broadcasting a series of pressure waves over the area. Specifically, the pressure waves have preset frequencies that are multiples of the wing beat speed of the insects.

SUMMARY

In accordance with embodiments of the invention, a system is provided to repel a flying insect from an area by generating pressure waves that interfere with the flight of the flying insect in the area. Instead of generating pressure waves at one or more preset frequencies, the system detects the frequency at which the flying insect is flapping its wings and then generates the appropriate pressure waves to disrupt and thereby repel the flying insect.

In one embodiment of the invention, the system includes (1) a microphone for converting pressure waves generated by the flying insect into electrical signals, and (2) a speaker for generating pressure waves toward the flying insect based on the electrical signals.

BRIEF DESCRIPTION OF THE DRAWINGS

Use of the same reference numbers in different figures indicates similar or identical elements. Figures are not drawn to scale and are for illustrative purposes only.

DETAILED DESCRIPTION

Figure 1:
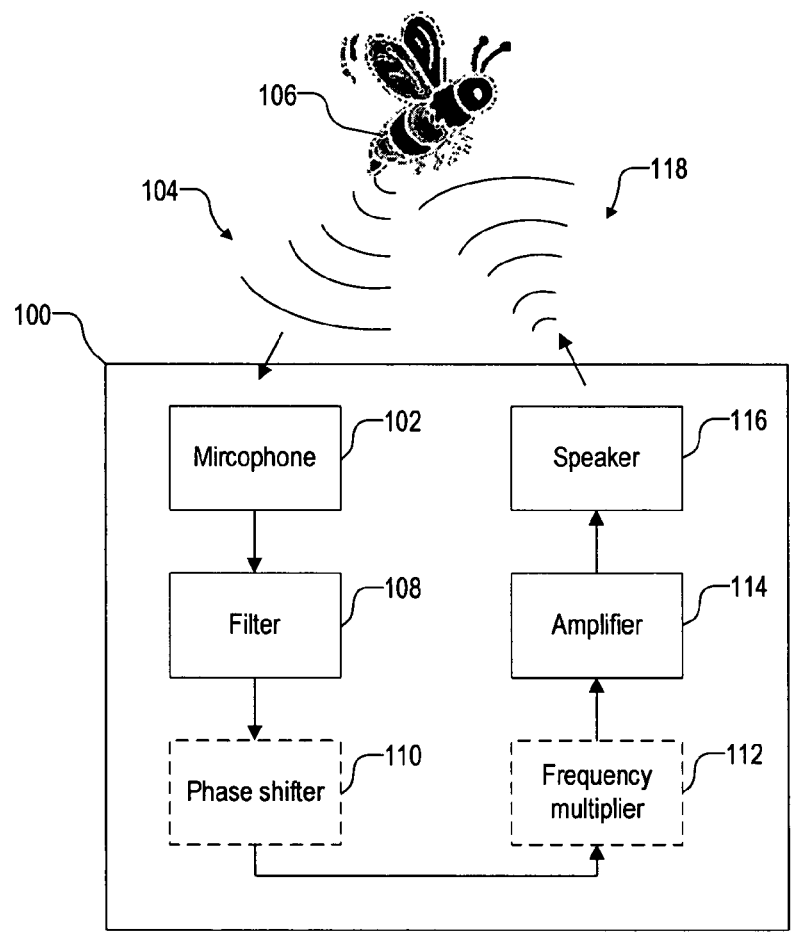
FIG. 1 is a block diagram of an insect repelling system in one embodiment of the invention.
Figure 2:
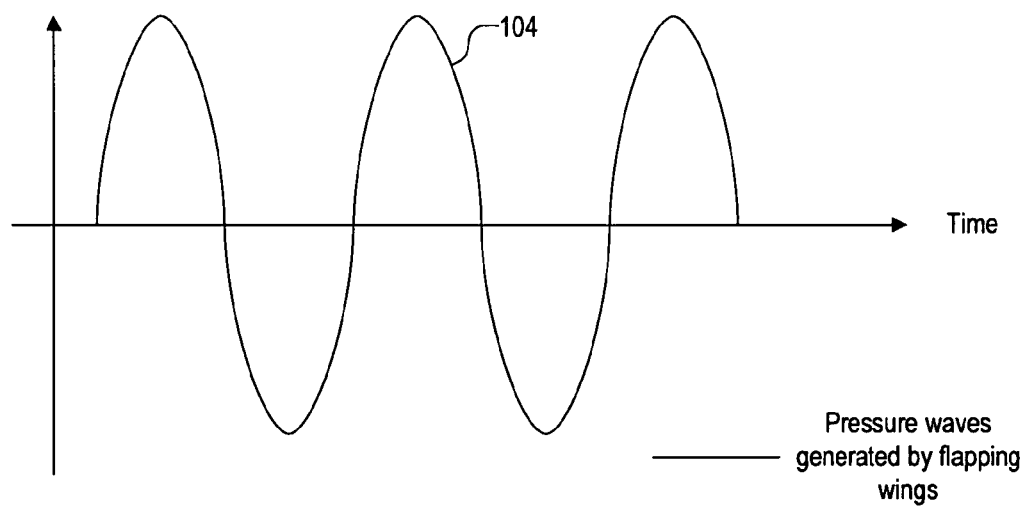
FIG. 2 illustrates pressure waves generated by a flying insect flapping its wings in one embodiment of the invention.

FIG. 1 is a block diagram of an insect repelling system 100 in one embodiment of the invention. System 100 includes a microphone 102 for receiving varying pressure waves 104 generated by a nearby flying insect 106 flapping its wings. Microphone 102 converts pressure waves 104 into a varying electrical signal. FIG. 2 illustrates an exemplary pressure wave 104 received from insect 106.

Referring back to FIG. 1, a filter 108 is connected to microphone 102 to receive the electrical signal. Filter 108 passes only the electrical signal at selected frequencies. The selected frequencies correspond to the frequencies at which flying insect 106 can flap its wings. The selected frequencies depend on the flying insect that device 100 intends to repel.

An optional phase shifter 110 is connected to filter 108 to receive the frequency-filtered electrical signal. Phase shifter 100 shifts the phases of the electrical signal by a predetermined number of degrees.

An optional frequency multiplier 112 is connected to phase shifter 110 to receive the phase-shifted electrical signal. Frequency multiplier 112 multiplies the frequencies of the electrical signal by a predetermined factor so the resulting frequencies are inaudible to the human ear.

An amplifier 114 is connected to frequency multiplier 112 to receive the frequency-multiplied electrical signal. Amplifier 114 amplifies the magnitudes of the electrical signal by a predetermined factor.

A speaker 116 is connected to amplifier 114 to receive the amplified electrical signal. Speaker 116 converts the electrical signal into a varying pressure wave 118 directed to the general vicinity of flying insect 106.

Figure 3:
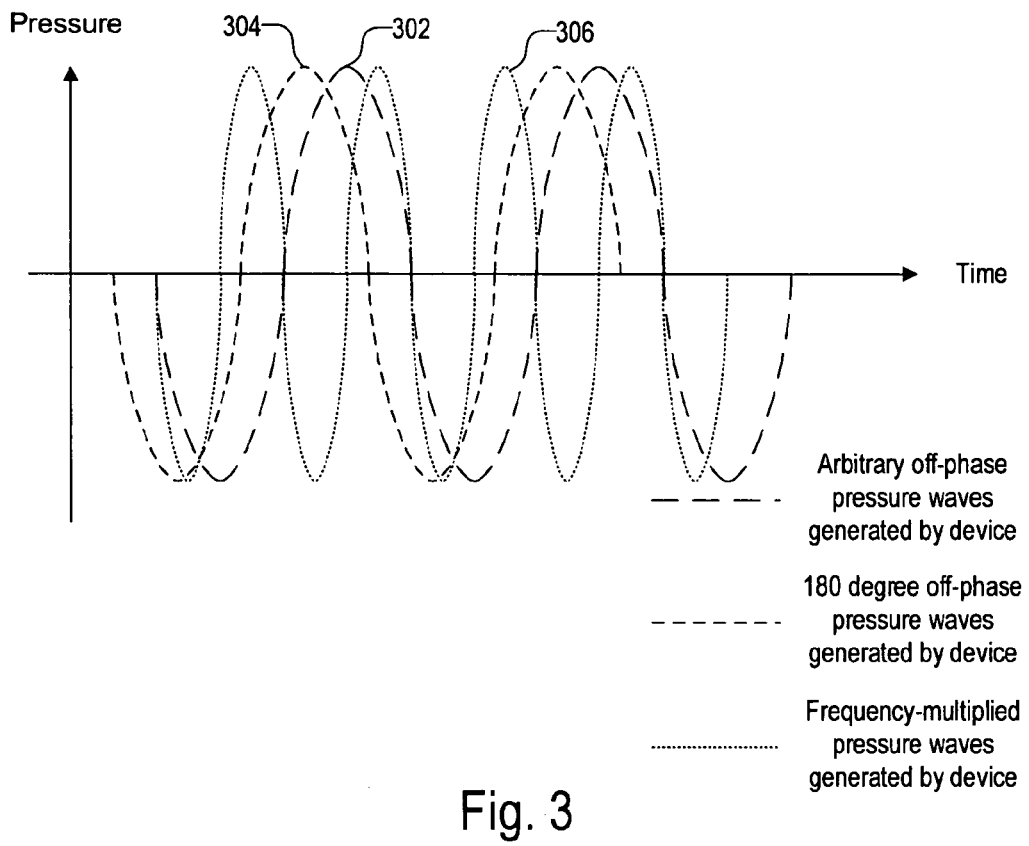
FIGS. 3, 4, and 5 illustrate pressure waves generated by the system of FIG. 1 in embodiments of the invention.

FIG. 3 illustrates exemplary pressure waves that can be generated in one embodiment of the invention. Pressure wave 302 has the same frequency as pressure wave 104 from insect 106 (FIG. 1) but is offset from pressure wave 104 by an arbitrary phase shift. Pressure wave 304 has the same frequency as pressure wave 104 but is phase shifted from pressure wave 104 by 180 degrees. Pressure wave 306 has twice the frequency of pressure wave 104 and is offset from pressure wave 104 by an arbitrary phase shift. As can be seen, with the components of system 100 (FIG. 1), a variety of pressure waves can be generated based on pressure wave 104 from insect 106.

Figure 4:
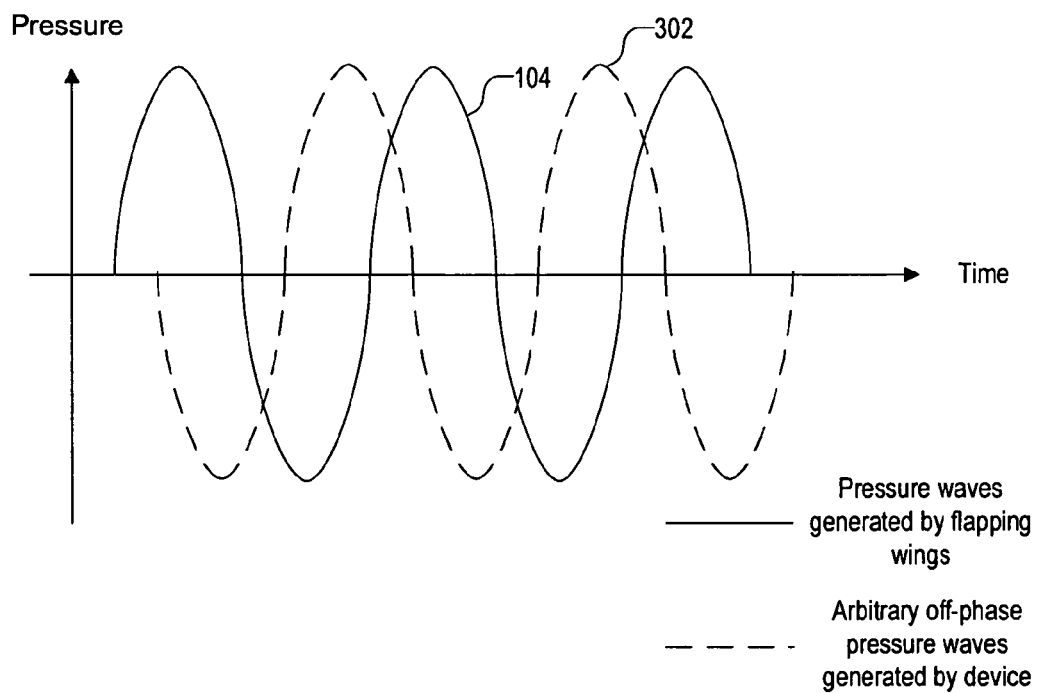

FIG. 4 illustrates the application of pressure wave 302 to insect 106 in one embodiment of the invention. As can be seen, pressure wave 302 is offset from pressure wave 104 by an arbitrary phase shift to disrupt the lift generation of the insect wings and the insect's ability to control flight direction. This causes flying insect 106 to avoid the general area where device 100 is deployed.

Figure 5:
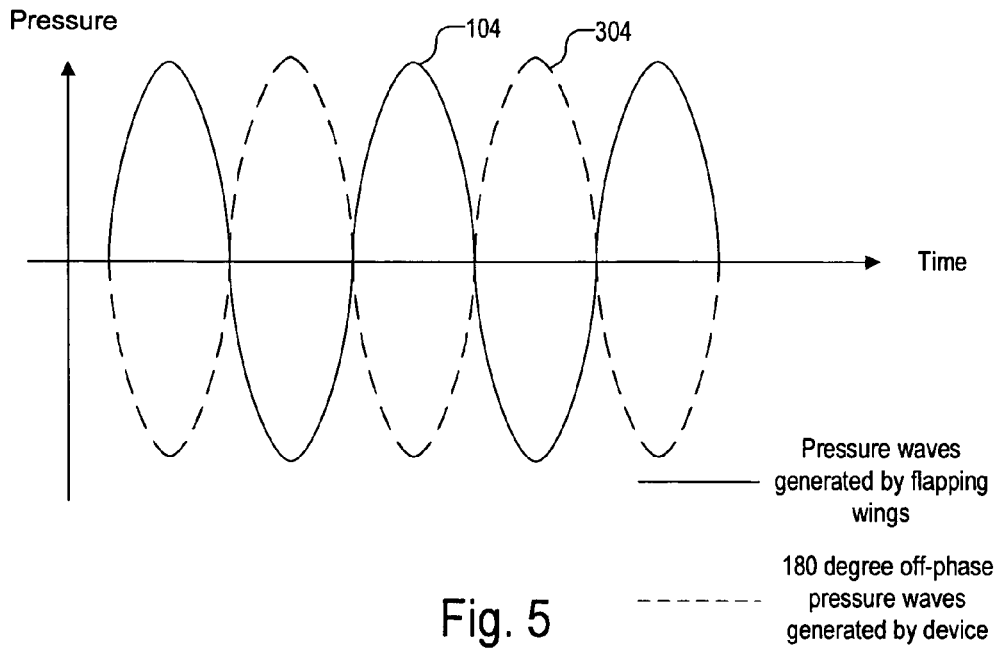

Similarly, FIG. 5 illustrates the application of pressure wave 304 to insect 106 in one embodiment of the invention. As can be seen, pressure wave 304 is phase shifted 180 degrees from pressure wave 104. This is expected to significantly disrupt the lift generation of the insect wings and the insect's ability to control flight direction.

Figure 6:
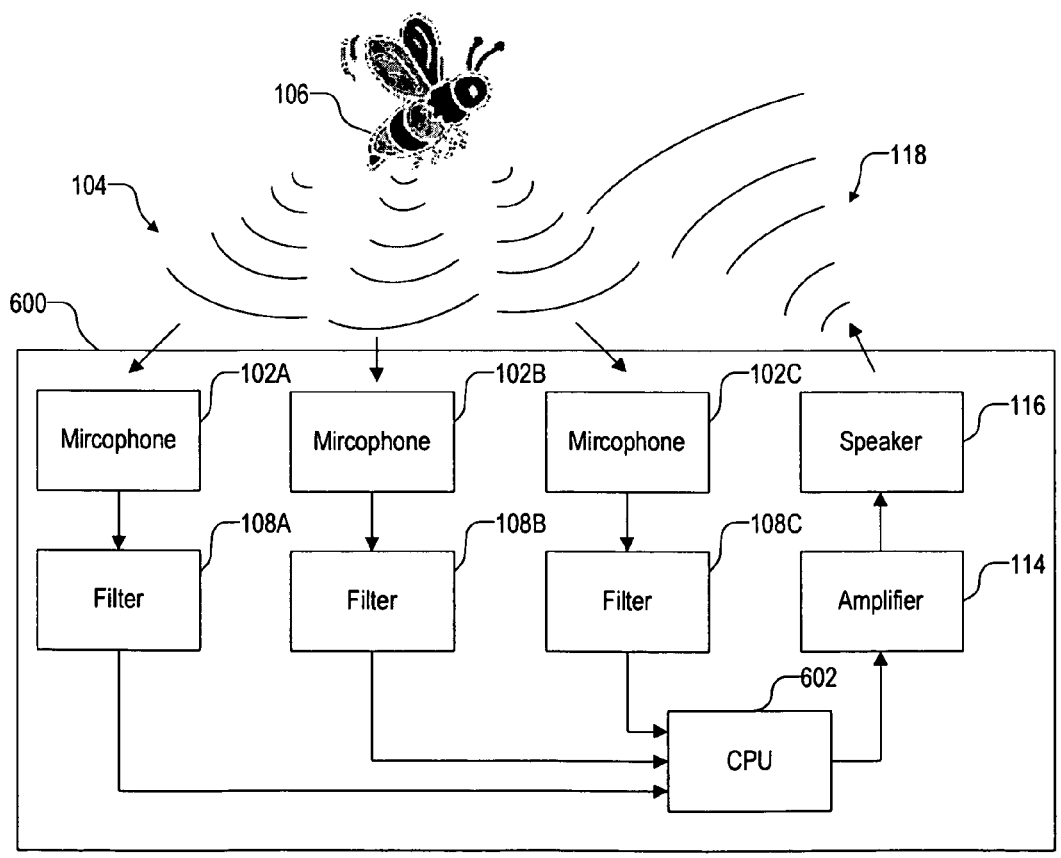
FIG. 6 is a block diagram of an insect repelling system in another embodiment of the invention.

FIG. 6 is a block diagram of an insect repelling system 600 in one embodiment of the invention. System 600 includes microphones 102A, 102B, and 102C that are spaced apart to capture pressure wave 104 from insect 106 at different locations. Their electrical signals are respectively filtered by filters 108A, 108B, and 108C and then passed to a processor 602.

Processor 602 determines the location of insect 106 from differences in the wavelengths of the signals from microphones 108A, 108B, and 108C. According to the location of insect 106, processor 602 generates signals to amplifier 114, which in turn drives speaker 116, to create a pressure wave 118 that reaches insect 106 with the desired phase shift. Thus, processor 602 acts as phase shifter 110 (FIG. 1) in system 100 (FIG. 1) but adopts the phase shift of pressure wave 118 according to the location of insect 106. In addition, processor 602 can also act as frequency multiplier 112 (FIG. 1) in system 100 to increase the frequency of pressure wave 118 so it is inaudible to the human ear.

Various other adaptations and combinations of features of the embodiments disclosed are within the scope of the present teaching. Numerous embodiments are encompassed by the following claims.

What is claimed is:

1. A system for repelling a flying insect in an area, comprising:
  a microphone converting a first plurality of pressure waves generated by the flying insect flapping its wings into an electrical signal;
  a signal processing circuit for converting the electrical signal into a control signal, wherein the signal processing circuit comprises:
    a filter coupled to the microphone, the filter passing the electrical signal at frequencies that the flying insect can flap its wings;
    a phase shifter coupled to the filter, the phase shifter changing a phase of the electrical signal; and
    a frequency multiplier coupled to the phase shifter, the frequency multiplier changing a frequency of the electrical signal; and a speaker generating a second plurality of pressure waves broadcasted toward the area, wherein the second plurality of pressure waves is based on the control signal.

2. The system of claim 1, wherein the phase shifter changes the phase by 180 degrees.

3. The system of claim 1, further comprising:
an amplifier coupled between the frequency multiplier and the speaker, the amplifier changing a magnitude of the control signal and providing the control signal to the speaker to generate the second plurality of pressure waves.

4. The system of claim 1, further comprising:
a second microphone converting the first plurality of pressure waves into a second electrical signal;
a third microphone converting the first plurality of pressure waves into a third electrical signal; and
a processor for modifying the control signal based on the electrical signal, the second electrical signal, and the third electrical signal.

5. The system of claim 4, wherein the processor determines a location of the flying insect and modifies the control signal according to the location.

6. The system of claim 4, further comprising three filters coupled between the microphone, the second microphone, and the third microphone and the processor.

7. The system of claim 6, further comprising an amplifier coupled between the processor and the speaker, the amplifier changing a magnitude of the control signal.

8. A method for repelling a flying insect in an area, comprising:
converting a first plurality of pressure waves generated by the flying insect flapping its wings into an electrical signal;
processing the electrical signal into a real-time control signal; and
generating a second plurality of pressure waves broadcasted toward the area to repel the flying insect, wherein the second plurality of pressure waves being based on the control signal.

9. The method of claim 8, further comprising:
filtering the electrical signal to pass only the electrical signal at frequencies which the flying insect can flap its wings.

10. The method of claim 9, further comprising:
phase-shifting the electrical signal.

11. The method of claim 10, wherein said phase-shifting comprises shifting the phase by 180 degrees.

12. A method for repelling a flying insect in an area, comprising:
converting a first plurality of pressure waves generated by the flying insect flapping its wings into an electrical signal representative of the first plurality of pressure waves;
processing the electrical signal to generate a control signal, wherein said processing the electrical signal includes:
filtering the electrical signal to pass only the electrical signal at frequencies which the flying insect can flap its wings;
phase-shifting the electrical signal; and
frequency-multiplying the electrical signal; and
based on the control signal, generating a second plurality of pressure waves broadcasted toward the area to repel the flying insect.

13. The method of claim 8, further comprising:
amplifying the electrical signal.

14. The method of claim 8, further comprising:
converting the first plurality of pressure waves into a second electrical signal and a third electrical signal; and
modifying the control signal based on the electrical signal, the second electrical signal, and the third electrical signal.

15. The method of claim 14, wherein said modifying the control signal based on the electrical signal, the second electrical signal, and the third electrical signal comprises:
determining a location of the flying insect; and
generating the control signal according to the location.

16. The method of claim 15, wherein said modifying the control signal based on the electrical signal, the second electrical signal, and the third electrical signal further comprising filtering the electrical signal, the second electrical signal, and the third electrical signal.

17. The method of claim 16, further comprising changing a magnitude of the control signal.

18. A system for repelling a flying insect in an area, comprising:
a microphone configured to convert a first plurality of pressure waves generated by the flying insect flapping its wings into an electrical signal representative of the first plurality of pressure waves;
a signal processing circuit configured to convert the electrical signal into a control signal; and
a speaker configured to generate a second plurality of pressure waves broadcasted toward the area to repel the insect, wherein the second plurality of pressure waves is generated based on the control signal.

19. The system of claim 18, wherein the processing circuit comprises:
a filter coupled to the microphone, the filter passing the electrical signal at frequencies that the flying insect can flap its wings.

20. The system of claim 19, wherein the processing circuit further comprises:
a phase shifter coupled to the filter, the phase shifter changing a phase of the electrical signal; and
a frequency multiplier coupled to the phase shifter, the frequency multiplier changing a frequency of the electrical signal.

21. The system of claim 20, further comprising:
an amplifier coupled between the frequency multiplier and the speaker, the amplifier changing a magnitude of the electrical signal and providing the control signal to the speaker to generate the second plurality of pressure wave.

22. The system of claim 18, further comprising:
a second microphone converting the first plurality of pressure waves into a second electrical signal;
a third microphone converting the first plurality of pressure waves into a third electrical signal; and
a processor configured to modify the control signal based on the electrical signal, the second electrical signal, and the third electrical signal.

23. The system of claim 22, wherein the processor is configured to determine a location of the flying insect and modify the control signal according to the location.

* * * * *